United States Patent
Yue et al.

(10) Patent No.: US 10,907,828 B2
(45) Date of Patent: Feb. 2, 2021

(54) INTEGRATED TREATMENT METHOD OF TWO-STAGE SUBMERGED COMBUSTION EVAPORATION FOR ORGANIC WASTE LIQUID

(71) Applicant: Tsinghua University, Beijing (CN)

(72) Inventors: Dongbei Yue, Beijing (CN); Lingyue Zhang, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 16/613,325

(22) PCT Filed: Nov. 7, 2018

(86) PCT No.: PCT/CN2018/114342
§ 371 (c)(1),
(2) Date: Nov. 13, 2019

(87) PCT Pub. No.: WO2019/140986
PCT Pub. Date: Jul. 25, 2019

(65) Prior Publication Data
US 2020/0340670 A1    Oct. 29, 2020

(30) Foreign Application Priority Data

Jan. 16, 2018 (CN) .......................... 2018 1 0040048

(51) Int. Cl.
*C02F 1/16* (2006.01)
*F23G 7/00* (2006.01)
*C02F 103/06* (2006.01)

(52) U.S. Cl.
CPC ............... *F23G 7/008* (2013.01); *C02F 1/16* (2013.01); *C02F 2103/06* (2013.01);
(Continued)

(58) Field of Classification Search
CPC ..... B01D 1/14; B01D 1/30; C02F 1/04; C02F 1/048; C02F 1/16; F23G 7/008;
(Continued)

(56) References Cited

U.S. PATENT DOCUMENTS 3,840,002 A * 10/1974 Douglas .................. F23C 3/004
126/360.2
5,695,643 A * 12/1997 Brandt ..................... C02F 1/441
166/267

(Continued)

FOREIGN PATENT DOCUMENTS

CN    1199867 C    5/2005
CN    1211289 C    7/2005
(Continued)

OTHER PUBLICATIONS

Office Action and English translation thereof in Chinese Application No. 201810040048.3, dated Mar. 26, 2019, 13 pages.
(Continued)

*Primary Examiner* — Jonathan Miller
(74) *Attorney, Agent, or Firm* — Fish & Richardson P.C.

(57) ABSTRACT

The present disclosure relates to an integrated treatment method of two-stage submerged combustion evaporation for organic waste liquid, the organic waste liquid to be disposed flowing into two evaporation chambers in succession for two-stage submerged combustion evaporation. The two evaporation chambers are provided in one evaporation tank and communicate with each other at the bottom of the evaporation tank, the organic waste liquid enters a first evaporation chamber from a raw liquid inlet pipe, and the organic waste liquid flows from the first evaporation chamber to a second evaporation chamber during submerged combustion evaporation. The method has advantages of improving the evaporation concentration efficiency, reducing the numbers of evaporators and transport pipes of all (Continued)

sorts of gases and liquids and saving energy, saving the area occupied and the cost, while simplifying treatment process and facilitating operation management.

9 Claims, 1 Drawing Sheet

(52) U.S. Cl.
CPC .... *F23G 2202/10* (2013.01); *F23G 2204/103* (2013.01); *F23G 2206/10* (2013.01); *F23G 2209/10* (2013.01); *F23G 2900/00001* (2013.01); *F23G 2900/50211* (2013.01)

(58) Field of Classification Search
CPC ........... F23G 2202/10; F23G 2204/103; F23G 2206/10; F23G 2209/10; F23G 2900/00001; F23G 2900/50211
See application file for complete search history.

(56) References Cited

U.S. PATENT DOCUMENTS

| | | | |
|---|---|---|---|
| 6,546,883 B1 | 4/2003 | Fink et al. | |
| 6,913,671 B2* | 7/2005 | Bolton | B01D 1/30 159/16.2 |
| 7,832,714 B2* | 11/2010 | Duesel, Jr. | B01D 5/006 261/77 |
| 7,845,314 B2* | 12/2010 | Smith | B01D 1/14 122/379 |
| 8,136,797 B2* | 3/2012 | Duesel, Jr. | B01D 1/14 261/77 |
| 8,852,393 B2* | 10/2014 | Panz | C02F 1/048 159/16.2 |
| 8,852,394 B2* | 10/2014 | Panz | C02F 1/048 159/16.2 |
| 9,533,905 B2* | 1/2017 | Charbonneau | C03B 5/173 |

FOREIGN PATENT DOCUMENTS

| | | |
|---|---|---|
| CN | 1263530 C | 7/2006 |
| CN | 1278963 C | 10/2006 |
| CN | 1583612 A | 10/2006 |
| CN | 1884158 A | 12/2008 |
| CN | 1891643 A | 12/2008 |
| CN | 102471094 A | 5/2012 |
| CN | 102964019 A | 3/2013 |
| CN | 103047659 A | 4/2013 |
| CN | 104913313 A | 9/2015 |
| CN | 105066146 A | 11/2015 |
| CN | 105240861 A | 11/2015 |
| CN | 106044905 A | 10/2016 |
| CN | 106044908 A | 10/2016 |
| CN | 106110695 A | 11/2016 |
| CN | 108178214 A | 6/2018 |
| CN | 108249495 A | 7/2018 |
| KR | 10024608 B1 | 3/2000 |
| WO | WO2007014085 A1 | 1/2007 |
| WO | WO2008088348 A1 | 7/2008 |

OTHER PUBLICATIONS

Office Action, allowed claims, and English translations thereof in Chinese Application No. 201810040048.3, dated May 5, 2019, 13 pages.

* cited by examiner

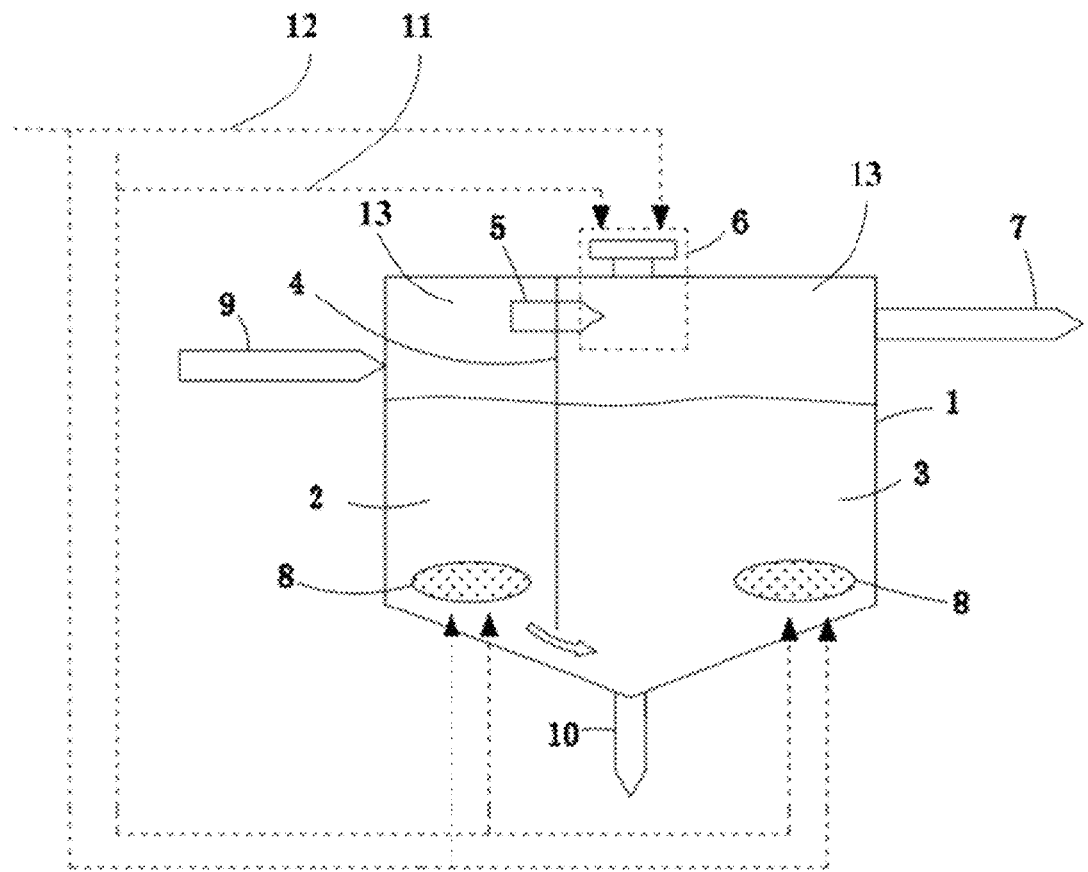

INTEGRATED TREATMENT METHOD OF TWO-STAGE SUBMERGED COMBUSTION EVAPORATION FOR ORGANIC WASTE LIQUID

CROSS-REFERENCE TO RELATED APPLICATION

The present application is a U.S. National Phase Application pursuant to 35 U.S.C. § 371 of International Application No. PCT/CN2018/114342, filed on Nov. 7, 2018, which claims the priority of Chinese Patent Application No. 201810040048.3, titled "Integrated Treatment Method of Two-Stage Submerged Combustion Evaporation for Organic Waste Liquid", filed on Jan. 16, 2018, the entire contents of which are incorporated herein by reference.

TECHNICAL FIELD

The present disclosure relates to the technical field of organic waste liquid treatment for environmental protection, and in particular to a treatment technique of evaporating and concentrating landfill leachate.

BACKGROUND

The landfill leachate treatment has always been a major issue in the comprehensive treatment of domestic wastes in China. China's domestic wastes are featured in high moisture content, large leachate output and high pollutant concentration as well as wide range of water quality change. The landfill leachate treatment in China is obviously more difficult than that in such developed countries as Europe and the United States.

Landfill leachate contains therein a large amount of easily degradable and refractory organics, ammonia nitrogen, inorganic salts and the like. Currently, as a leading treatment means, the biological treatment method can remove most of easily degradable organics and convert ammonia nitrogen into nitrate nitrogen (which can be further removed by supplementing carbon source), while, in general, residual refractory organics and other pollutants can only be removed by membrane process, such as nanofiltration, reverse osmosis or the like. However, the membrane treatment is merely a physical interception process, and the resulting membrane concentrate is enriched with a large amount of refractory organics and salts. Although an advanced oxidation process can decompose and remove the refractory organics, it is less likely to remove nitrogen-containing pollutants, and problems such as process stability and relatively high treatment cost are still required to be resolved in practical applications. The submerged combustion evaporation technology based on the direct-contact heat transfer principle completely evades the scaling problem. Moreover, the two-stage submerged combustion evaporation technique is used to remove volatile organics during evaporation and finally aggregates all organic and inorganic pollutants and salts in solid residues, so it has been widely applied in the treatment project for landfill leachate, in particular for membrane concentrate.

The Chinese Patent No. 200410042794.4 (Publication No.: CN1278963C) discloses a two-stage treatment method of evaporation concentration and incineration of landfill leachate. The current two-stage submerged combustion evaporation technique requires, however, at least two submerged combustion evaporators in series, and the two submerged combustion evaporators are disposed in two evaporation tanks respectively. It involves many devices, high investment, a long technological process, and relatively complicated operation management.

Thus, the prior art has the following drawbacks in performing the two-stage submerged combustion evaporation:

first, a large number of devices are used with a large covering area occupied;

second, a large investment is needed due to long transport pipes for all sorts of gases and liquids, and the available high-temperature vapor dissipates more heat during long-distance transportation; and third, a plurality of evaporation tanks is in need of control, thereby making the process complex and management inconvenient.

SUMMARY

To solve or alleviate at least one of the above technical problems, the present disclosure provides an integrated treatment method of two-stage submerged combustion evaporation for organic waste liquid, the organic waste liquid to be disposed flowing into two evaporation chambers in succession for two-stage submerged combustion evaporation. The two evaporation chambers are provided in one evaporation tank and communicate with each other at the bottom of the evaporation tank, the organic waste liquid enters a first evaporation chamber from a raw liquid inlet pipe, and the organic waste liquid flows from the first evaporation chamber to a second evaporation chamber during submerged combustion evaporation.

In at least one embodiment, the second evaporation chamber includes a combustion chamber arranged at the upper portion of the second evaporation chamber, and evaporated gas generated in the first evaporation chamber is passed into the combustion chamber for combustion treatment.

In at least one embodiment, gas resulting from combustion in the combustion chamber is passed into the organic waste liquid in the second evaporation chamber.

In at least one embodiment, exhaust gas resulting from submerged combustion evaporation in the second evaporation chamber is directly discharged from the evaporation tank to environmental air or is condensed.

In at least one embodiment, a concentrate and/or crystal concentrated in the second evaporation chamber is discharged from the bottom of the evaporation tank.

In at least one embodiment, the first evaporation chamber and the second evaporation chamber are divided via a partition, there is a gap between the partition and the bottom of the evaporation tank, and residence time of the organic waste liquid in the first evaporation chamber is controlled by adjusting a partition position of the partition and/or size of the gap.

In at least one embodiment, high-temperature gas resulting from combustion of combustible gas and comburent gas is torn into microbubbles through gas distribution systems at the bottoms of the first and second evaporation chambers, and the microbubbles come into contact with the organic waste liquid for evaporation.

In at least one embodiment, the combustible gas is one or more of anaerobic biogas, landfill gas, and waste pyrolysis gas.

In at least one embodiment, temperature of the combustion chamber in the second evaporation chamber is not lower than 850° C., the temperature of the organic waste liquid discharged from the first evaporation chamber is 89° C. to 95° C., and temperature of exhaust gas discharged from the evaporation tank is lower than 100° C.

In at least one embodiment, the organic waste liquid is landfill leachate or concentrate of the landfill leachate.

The aforementioned technical solutions achieve the following advantageous effects:

(i). the present disclosure implements two-stage submerged combustion evaporation technique in one submerged combustion evaporation device, so that the leachate concentration multiple is increased and the evaporated exhaust gas meets with the emission standard;

(ii). by adjusting the height position and/or the partition position of the partition in the evaporation tank, the present disclosure can easily control the residence time of the treatment fluid in the two evaporation chambers, that is, control the duration of the submerged combustion evaporation at the two stages;

(iii). by utilizing anaerobic biogas, landfill gas or waste pyrolysis gas resulting from waste treatment as combustion energy, and using of the waste heat resulting from combustion of pollutants, the present disclosure realizes unified treatment of two secondary pollution sources in landfill site, achieves the effect of "waste control by waste", and avoid the concurrent evaporation of water and pollutants and the huge waste of energy;

(iv). compared with the previous "two-stage submerged combustion evaporation technique", in which two evaporators are used in combination, the present disclosure reduces the numbers of evaporators and transport pipes for various gases and liquids, saves the area occupied and the upfront investment costs of apparatuses construction, while simplifies the treatment process and facilitates the operation management.

It is understood that the present disclosure focuses on achieving two-stage submerged combustion evaporation technique in one evaporation tank. The present disclosure does not limit or exclude simultaneous use of two evaporation tanks of the present disclosure or use of the evaporation tank of the present disclosure with others.

BRIEF DESCRIPTION OF THE DRAWINGS

FIG. 1 is a structural schematic diagram for a two-stage submerged combustion evaporation integrated device according to one embodiment of the present disclosure.

REFERENCE SIGNS LIST

1 Evaporation Tank; 2 First Evaporation Chamber; 3 Second Evaporation Chamber; 4 Partition Plate; 5 In-Tank Communicating Pipe; 6 Combustion Chamber; 7 Vapor Discharge Pipe; 8 Gas Distribution System; 9 Raw Liquid Inlet Pipe; 10 Bottom Discharge Pipe; 11 Combustible Gas; 12 Comburent Gas; 13 Vapor Space.

DETAILED DESCRIPTION

To elaborate the above objective, characteristics and advantages of the present disclosure more explicitly, the detailed embodiments of the present disclosure are described herein in conjunction with the accompanying drawing. The present disclosure can be implemented in other different ways or forms, in addition to various embodiments described herein. Corresponding improvements, modifications and replacements may occur to one skilled in the art without departing from the spirit of the present disclosure, the present disclosure therefore is not limited to the described embodiments herein. The scope of protection of the present disclosure for invention is subject to the claims.

The overview structure of the device used in the method of the present disclosure and the implementation of the method of the present disclosure will be introduced below with reference to FIG. 1.

(Structure of Device)

The two-stage submerged combustion evaporation integrated apparatus according to the present disclosure includes an evaporation tank 1 in form of mono block. The inside of the evaporation tank 1 is divided into two evaporation chambers by a partition plate 4, i.e., a first evaporation chamber 2 and a second evaporation chamber 3. A gap is reserved between the bottom of the partition plate 4 and the bottom of the evaporation tank 1, so that the first evaporation chamber 2 communicates with the second evaporation chamber 3 at the bottom.

The first evaporation chamber 2 is provided with a raw liquid inlet pipe 9 to connect with the outside, and the second evaporation chamber 3 is provided with a vapor discharge pipe 7 to connect with the outside. A bottom discharge pipe 10 is arranged in the region corresponding to the second evaporation chamber at the bottom of the evaporation tank 1.

The bottom of the evaporation tank 1 is preferably designed as an inclined structure, such as a taper, a horn shape, a sloping shape or the like, so that the height of the tank bottom in the vicinity of both sides of the partition plate 4 enables the leachate and/or the salt slurry formed by evaporated leachate in the first evaporation chamber 2 to flow into the second evaporation chamber 3 under gravity (the hollow arrow in FIG. 1 shows the flow direction of leachate). For example, in the case where the evaporation tank 1 is cylindrical, the tank bottom thereof is designed as a cone, with the conical vertex locating in the region corresponding to the bottom of the second evaporation chamber 3.

In other embodiments, the bottom of the evaporation tank 1 also may not be designed as an inclined structure. During submerged combustion evaporation, the first evaporation chamber 2 receives the leachate continuously replenished from the raw liquid inlet pipe 9. The liquid level difference between two evaporation chambers causes the leachate to flow from the first evaporation chamber 2 into the second evaporation chamber 3.

The partition plate 4 is provided to be movable up and down. By adjusting the height of the partition plate 4, the gap between the bottom of the partition plate 4 and the bottom of the evaporation tank 1 can be adjusted, so as to adjust and control the residence time of the leachate in the two evaporation chambers.

The vapor spaces 13 at the upper portions of the first evaporation chamber 2 and the second evaporation chamber 3 are communicated via an in-tank communication pipe 5. A combustion chamber 6 is arranged at the upper portion of the second evaporation chamber 3. The in-tank communication pipe 5 can introduce the gas resulting from submerged combustion evaporation in the first evaporation chamber 2 into the combustion chamber 6 at the upper portion of the second evaporation chamber 3 to be incinerated.

Both of the bottoms of the first evaporation chamber 2 and the second evaporation chamber 3 are provided with gas distribution systems 8 that tear high-temperature gas generated from the combustion of combustible gas 11 and comburent gas 12 in the two evaporation chambers into microbubbles.

(Procedure and Process of Treatment)

In this embodiment, the organic waste liquid to be disposed is landfill leachate.

The landfill leachate is passed into the first evaporation chamber 2 through the raw liquid inlet pipe 9.

The comburent gas 12 and the combustible gas 11 are introduced into the combustion system, respectively. The combustible gas 11 is preferably one or more of biogas, landfill gas, and waste pyrolysis gas to reach an effect of "waste control by waste". High-temperature gas generated from combustion of combustible gas 11 and comburent gas 12 is torn into microbubbles by gas distribution systems in the evaporation chambers, so as to increase the heat transfer efficiency.

The residence time of landfill leachate in two evaporation chambers are controlled by adjusting the gap between the bottom of the partition plate 4 and the bottom of the evaporation tank 1 to a suitable value and/or adjusting the partition position of the partition plate 4 between the first evaporation chamber 2 and the second evaporation chamber 3. The way of adjusting the partition position of the partition plate 4 includes adjusting the horizontal position of the partition plate 4 between the first evaporation chamber 2 and the second evaporation chamber 3 or adjusting the partition attitude of the partition plate 4 between the first evaporation chamber 2 and the second evaporation chamber 3. The horizontal position of the partition plate 4 between the first evaporation chamber 2 and the second evaporation chamber 3 may manifest as the height of the bottom of the partition plate 4. The Different partition attitudes of the partition plate 4 manifest as different angles of the partition plate 4 relative to the vertical direction, or rotation around the vertical axis.

First Stage of Submerged Combustion Evaporation:

The landfill leachate entering the first evaporation chamber 2 is in direct contact with the high-temperature small bubbles outputted from the gas distribution system 8 in the first evaporation chamber 2. A large amount of volatile pollutants in the landfill leachate is first stripped to produce primary evaporated gas that mainly includes volatile organics, water vapor, carbon dioxide, and nitrogen.

The above primary evaporated gas enters the combustion chamber 6 in the second evaporation chamber 3 through the in-tank communication pipe 5 and is incinerated. The combustion temperature of the combustion chamber 6 can be 850° C. to 1100° C. Harmful pollutants such as volatile organics or the like in the primary evaporated gas are incinerated in the combustion chamber 6 to be removed.

Second Stage of Submerged Combustion Evaporation:

Upon the completion of the first stripping concentration of landfill leachate in the first evaporation chamber 2, the landfill leachate flows into the second evaporation chamber 3 under gravity through the region where the bottoms of the first evaporation chamber 2 and the second evaporation chamber 3 are communicated. The landfill leachate flowing out of the first evaporation chamber 2 may have a temperature of 85° C. to 95° C.

The high-temperature combustion gas resulting from the combustion in the combustion chamber 6 is further passed into the landfill leachate in the second evaporation chamber 3, which not only achieves re-treatment of residual pollutants in the combustion gas but also utilizes high-temperature heat.

The high-temperature small bubbles outputted from the gas distribution system 8 in the second evaporation chamber 3 and the high-temperature combustion gas resulting from the combustion in the combustion chamber 6 are in direct contact with the landfill leachate in the second evaporation chamber 3 to perform a second stripping, thereby a final concentrate and/or crystal that are discharged through the bottom discharge pipe 10 are obtained. The secondary evaporated gas generated from the second evaporation chamber 3 mainly includes water vapor, carbon dioxide and nitrogen. The emission can meet with the requirements of the corresponding national standards. The secondary evaporated gas stated above may be directly discharged to the environment through a vapor discharge pipe 7, and the temperature thereof can be lower than 100° C. Alternatively, the secondary evaporated gas stated above can also be condensed as desired after discharged from the evaporation tank 1 through the vapor discharge pipe 7.

The two-stage submerged combustion evaporation integrated device according to the present disclosure can achieve the effect of the leachate concentration more than 10 times of the conventional two-stage treatment process, and can effectively control the pollution from the landfill leachate.

According to the two-stage submerged combustion evaporation integrated device of the present disclosure, the combustible gas 11 passed in may also be any other commercial fuels.

The above various embodiments may be arbitrarily combined without departing from the scopes and spirits of the present disclosure. For the sake of brevity, the descriptions of some of the parts and components are omitted herein; however, the parts and components should all be understood to be implemented by the existing technologies.

What is claimed is:

1. An integrated treatment method of two-stage submerged combustion evaporation for organic waste liquid, the organic waste liquid to be disposed flowing into two evaporation chambers in succession for two-stage submerged combustion evaporation, wherein, the two evaporation chambers are provided in one evaporation tank and communicate with each other at the bottom of the evaporation tank, the two evaporation chambers are divided via a partition, there is a gap reserved between the partition and the bottom of the evaporation tank, the organic waste liquid enters a first evaporation chamber from a raw liquid inlet pipe, and the organic waste liquid flows from the first evaporation chamber to a second evaporation chamber via the gap during submerged combustion evaporation, the bottom of the evaporation tank is designed as an inclined structure, so that the height of the bottom of the evaporation tank in the vicinity of both sides of the partition enables the organic waste liquid in the first evaporation chamber to flow into the second evaporation chamber under gravity, residence time of the organic waste liquid in the first evaporation chamber is controlled by adjusting a partition position of the partition and/or size of the gap.

2. The integrated treatment method of two-stage submerged combustion evaporation for organic waste liquid according to claim 1, wherein, a combustion chamber is arranged at an upper portion of the second evaporation chamber, and evaporated gas generated in the first evaporation chamber is passed into the combustion chamber in the second evaporation chamber for combustion treatment.

3. The integrated treatment method of two-stage submerged combustion evaporation for organic waste liquid according to claim 2, wherein, gas resulting from combustion in the combustion chamber is passed into the organic waste liquid in the second evaporation chamber.

4. The integrated treatment method of two-stage submerged combustion evaporation for organic waste liquid according to claim 1, wherein,
exhaust gas resulting from submerged combustion evaporation in the second evaporation chamber is directly discharged from the evaporation tank to environmental air or is condensed.

5. The integrated treatment method of two-stage submerged combustion evaporation for organic waste liquid according to claim 1, wherein,
a concentrate and/or crystal concentrated in the second evaporation chamber is discharged from the bottom of the evaporation tank.

6. The integrated treatment method of two-stage submerged combustion evaporation for organic waste liquid according to claim 2, wherein,
bottoms of the first and second evaporation chambers are provided with gas distribution systems, combustible gas and comburent gas are torn into microbubbles through the gas distribution systems, and the microbubbles come into contact with the organic waste liquid for evaporation.

7. The integrated treatment method of two-stage submerged combustion evaporation for organic waste liquid according to claim 6, wherein,
the combustible gas is one or more of anaerobic biogas, landfill gas, and waste pyrolysis gas.

8. The integrated treatment method of two-stage submerged combustion evaporation for organic waste liquid according to claim 6, wherein,
temperature of the combustion chamber in the second evaporation chamber is not lower than 850° C., temperature of the organic waste liquid discharged from the first evaporation chamber is 89° C. to 95° C., and temperature of exhaust gas discharged from the evaporation tank is lower than 100° C.

9. The integrated treatment method of two-stage submerged combustion evaporation for organic waste liquid according to claim 1, wherein,
the organic waste liquid is landfill leachate or concentrate of the landfill leachate.

* * * * *